March 8, 1966 J. RYWAK 3,239,779

FREE RUNNING MULTIVIBRATOR TRANSISTOR CIRCUIT

Filed Jan. 11, 1965

United States Patent Office 3,239,779

Patented Mar. 8, 1966

3,239,779
FREE RUNNING MULTIVIBRATOR TRANSISTOR CIRCUIT

John Rywak, Ottawa, Ontario, Canada, assignor to Northern Electric Company Limited, Montreal, Quebec, Canada Filed Jan. 11, 1965, Ser. No. 424,574
9 Claims. (Cl. 331—113)

This application is a continuation-in-part of application Serial Number 154,680, filed November 24, 1961, and now abandoned.

This invention relates to free-running multivibrator circuits employing transistors.

As is well-known, free running multivibrator circuits are useful as generators of square waves such as for pulses used for timing intervals. However, conventional free running multivibrator circuits have various undesirable characteristics, such for example as frequency variations due to temperature effects, and exponential slope on the trailing edge of the output waveform. Related to this characteristic is the fact that the recovery of each timing network, after it has performed its timing function, may require an undesirably long period of time and the timing network is not ready for reuse until after elapse of this period of time.

Accordingly, it is an object of the present invention, in one of its aspects, to provide a free running multivibrator circuit having means to reduce the temperature variations of the circuit. Another object of the invention, in another of its aspects, is to provide a free running multivibrator circuit having reduced recovery time for the timing network.

Further objects and advantages of the invention will appear from the following description, taken in conjunction with the drawings, wherein.

Figure 1:
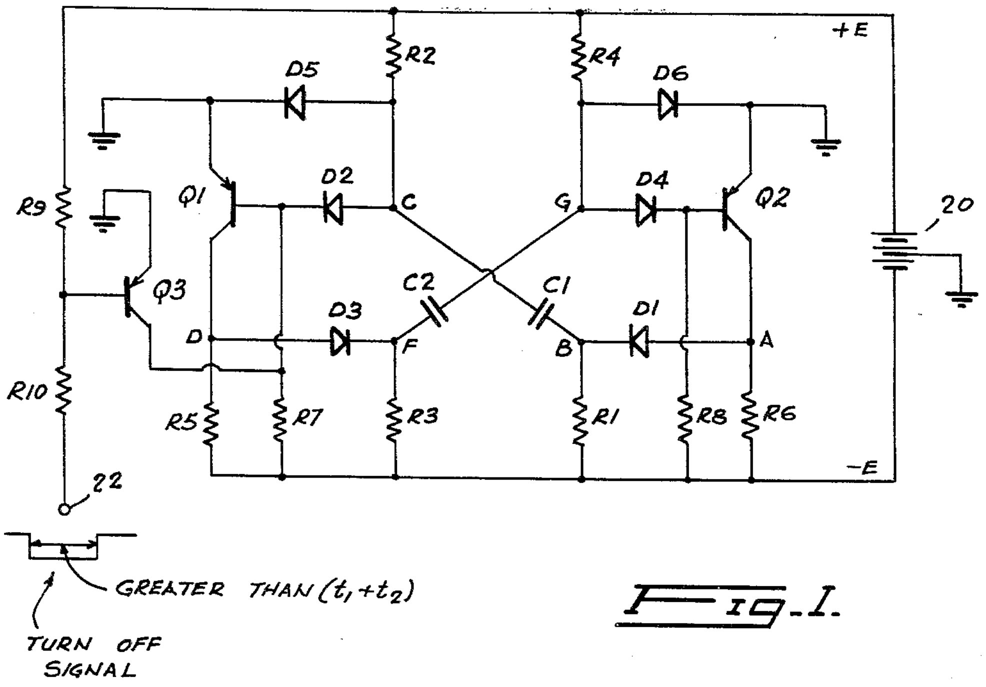
FIGURE 1 illustrates a free running multivibrator circuit according to the invention.

Referring now to FIGURE 1, there are shown first and second transistors Q1 and Q2 respectively, these transistors being cross-connected by a first coupling arm connected between the base of transistor Q1 and the collector of transistor Q2, and a second coupling arm connected between the base of transistor Q2 and the collector of transistor Q1. In the first coupling arm is located a diode D1 having its anode connected to the collector of transistor Q2 and its cathode connected to one side of a capacitor C1, the other side of the capacitor C1 being connected to the anode of another diode D2 and the cathode of diode D2 being connected to the base of transistor Q1. In the second coupling arm is located a diode D3 having its anode connected to the collector of transistor Q1 and its cathode connected to one side of a capacitor C2, the other side of capacitor C2 being connected to the anode of a diode D4, the cathode of diode D4 being connected to the base of transistor Q2. Also shown in the drawing is a diode D5 having its anode connected to the anode of diode D2 and its cathode connected to the emitter of transistor Q1, and a diode D6 having its anode connected to the anode of diode D4 and its cathode connected to the emitter of transistor Q2. The emitters of both transistors are grounded, ground poential thus constituting a reference voltage. A D.C. source 20 provides a voltage +E and —E relative to ground.

A timing resistor R1 for capacitor C1 is connected between the cathode of diode D1 and the —E supply; another timing resistor R2 for capacitor C1 is connected between the anode of diode D2 and the +E supply; a timing resistor R3 for capacitor C2 is connected between the cathode of diode D3 and the —E supply; and another timing resistor R4 for capacitor C2 is connected between the anode of diode D4 and the +E supply. Collector biasing resistors R5 and R6 are connected between the collectors of transistors Q1 and D2 respectively and the —E supply, while base biasing resistors R7 and R8 are connected between the bases of transistors Q1 and Q2 respectively, and the —E supply.

Points A, B, C and D, F, G are reference points.

A short circuiting transistor switch is provided to stop the free running action of the multivibrator when desired. This switch comprises a transistor Q3 having its collector connected to the base of transistor Q1, its emitter grounded, and its base connected through a resistor R9 to the +E supply and through a resistor R10 to a terminal 22.

In the preferred form of the invention, the transistor Q1 and Q2 and diodes D1 and D4 are fabricated from germanium while diodes D5 and D6 are fabricated from silicon.

Representative values for the resistors and capacitors employed in a circuit according to the invention are:

| | | |
|---|---|---|
| Resistors: | | |
| R1 | ohms | 8.2K |
| R2 | do | 56K |
| R3 | do | 8.2K |
| R4 | do | 56K |
| R5 | do | 4.7K |
| R6 | do | 4.7K |
| R7 | do | 68K |
| R8 | do | 68K |
| R9 | do | 22K |
| R10 | do | 220K |
| Capacitors: | | |
| C1 | m.f. | 0.005 |
| C2 | m.f. | 0.1 |

Source 20 may conveniently provide voltages +E and —E of +15 and —15 volts respectively.

It should be noted that for proper operation of the circuit:

$$R8>R4>R3 \text{ and } R7>R2>R1$$

The following is the operation of the circuit.

*Operation*

Assume that the multivibrator has just turned over into the state where transistor Q1 is turned on and transistor Q2 turned off. As will be explained shortly, just before transistor Q2 is turned off, reference point A was approximately at ground potential (since transistor Q2 was in saturation), diodes D1, D2, and D5 were forward biased, and capacitor C1 was in a substantially uncharged condition. This will be more fully explained below.

Now that transistor Q2 has turned off, the potential at reference point A falls approximately to —E (the actual potential of reference point A above the —E level being determined by the product of collector leakage current of transistor Q2 and the resistance of resistor R6). Due to the drop in potential at point A, diode D1 becomes reverse biased. Reference point B is now no longer held up at approximately ground potential through forward biased diode D1, but instead is connected to the —E supply through timing resistor R1. Current now begins to flow through the timing network consisting of resistor R1, capacitor C1, and resistor R2. This current causes points B and C to fall initially to a negative potential above —E (since resistor R2 is of higher resistance than resistor R1), the magnitude of such potential above −E being $$\frac{R1}{R1+R2}2E \text{ volts}$$

Therefore diodes D2 and D5 become reverse biased and diode D1 remains reverse biased. The timing network R1, C1, R2 is therefore disconnected from both transistors Q1 and Q2.

The timing network R1, C1, R2 now performs its timing function, controlling the duration of the conducting period of transistor Q1. Capacitor C1 charges through resistors R1 and R2, reference point B falling toward −E volts and reference point C rising toward +E volts. After a period of time determined primarily by the size of capacitor C1 and the resistance of resistors R1 and R2, reference point C reaches ground potential and forward biases diode D2. This completes the circuit through resistor R2, diode D2, and resistor R7, and since resistor R2 is less in resistance value than resistor R7, a positive potential is now applied at the base of transistor Q1, commencing to terminate conduction of transistor Q1.

As transistor Q1 comes out of saturation and begins to turn off, the potential at reference point D falls, thus reverse biasing diode D3. Current now begins to flow through the timing network R3, C2, R4 and reference points F and G fall to a negative potential, thus reverse biasing diodes D4 and D6. Since diode D4 is reverse biased, the base of transistor Q2 is no longer held up at a positive potential through circuit R4, D4 and R8 (recall that resistor R4 is of lesser resistance than resistor R8) but instead a negative potential is applied at the base of transistor Q2 through resistor R8. Therefore transistor Q2 begins to turn on into saturation.

As transistor Q2 turns on, reference point A rises in potential, forward biasing diode D1, and this rise is potential is transmitted through capacitor C1 and diode D2 to the base of transistor Q1, turning transistor Q1 off even more quickly. A quick regenerative action thus occurs, turning transistor Q2 on into saturation and transistor Q1 off entirely.

During the regenerative action, as transistor Q2 turns on and the rise in potential at point A is transmitted through diode D1 and capacitor C1 to point C, point C rises above ground to forward bias diode D5. With diode D5 forward biased, capacitor C1 discharges rapidly to ground through diode D5. In fact, capacitor C1 discharges both through diode D5 to ground and through diode D2 and resistor R7 to the −E supply, but since diode D5 carries the major proportion of the capacitor discharge current, it is the prime determining factor for the recovery time of the timing network which includes capacitor C1. Since the maximum discharge of capacitor C1 is limited only by the maximum permissible collector current of transistor Q2 and the forward resistance of diodes D5 and D1, very rapid recovery is realized.

The multivibrator is now in a condition in which transistor Q1 is off and transistor Q2 is on and in saturation. With transistor Q2 on and in saturation, reference point A is approximately at ground potential, diode D1 is hence forward biased, and reference point B is below ground by the magnitude of the forward voltage drop across diode D1. At the same time the potential at reference point C is held positive by the biasing network R2, D2, R7 (resistor R2 as mentioned being smaller in value than resistor R7). This forward biases diode D5, so that point C is above ground by the magnitude of the forward voltage drop of diode D5. Hence, during most of the time that transistor Q2 conducts (and during which time timing network R1, C1, R2 is not in use), capacitor C1 is in a substantially uncharged condition, being charged only to the extent caused by the forward voltage drops of diodes D1 and D5. These forward voltage drops are small.

Now that transistor Q2 is on and transistor Q1 is off, diodes D3, D4 and D6 are (as mentioned) reverse biased and the timing network R3, C2, R4 performs its function of controlling the duration of the conducting period of transistor Q2. Capacitor C2 charges through timing resistors R3 and R4, points F and G falling initially to a negative potential since resistor R4 is higher in resistance value than resistor R3. As capacitor C2 charges, point F falls in potential toward −E and point G rises toward +E. When point G reaches ground potential, diode D4 becomes forward biased, transistor Q2 begins to come out of saturation and turn off, reference point A begins to fall in potential to reverse bias diode D1 and the cycle repeats.

It will be noted that during the time when a transistor is conducting and its associated timing network is in operation, such timing network is disconnected from both transistors by reverse biased diodes. For example, when transistor Q2 conducts and timing network R3, C2, R4 is in operation, this timing network is disconnected from transistors Q1 and Q2 by reverse biased diodes D3 and D4 (and D6). By proper selection of resistors R5, R3, and R4 the potential at reference point D (which is mentioned is determined by the product of the collector leakage current of transistor Q1 and the resistance of resistor R5) will be more negative than the potential at reference point F during the whole of the conducting period of transistor Q2 thus causing diode D3 to be reversed biased during the whole of the conducting period of transistor Q2. The timing network R3, C2, R4 is therefore isolated from both transistors Q1 and Q2 during substantially the whole of the conducting period of transistor Q2 (except for a brief interval at the end of the conducting period of transistor Q2, after point G reaches ground and diode D4 becomes forward biased and before transistor Q2 comes out of saturation to commence a regenerative action). The dependence of the charging time of capacitor C2 upon temperature dependent parameters of transistors Q1 and Q2 is therefore reduced. The same is true of the timing network comprising resistor R1, capacitor C1 and resistor R2.

Diode D3 could of course be omitted if desired (together with resistor R5, capacitor C2 being connected directly to the collector of transistor Q1) but then, during charging of capacitor C2, timing circuits R3, C2, R4 would be isolated only from transistor Q2. Diode D1 (and resistor R6) could be similarly omitted, in which case timing circuit R1, C1, R2 would be isolated from transistor Q1, but not from transistor Q2, during charging of capacitor C1.

It may be noted that after a timing network, for example the timing network comprising resistor R3, capacitor C2, and resistor R4, has performed its timing functions, capacitor C2 discharges very rapidly through diode D6 to ground, so that the timing circuit is ready for reuse in a very short period of time.

Figure 2:
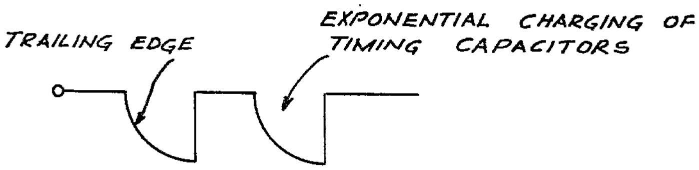
FIGURE 2 shows an output waveform for a conventional free running multivibrator circuit.

FIGURE 2 shows an output waveform of a conventional multivibrator, this output waveform representing the collector voltage of one of the transistors of such a multivibrator. A typical conventional multivibrator is shown on page 331 of "Transistor Logic Circuits" by Richard E. Hurley, John Wiley & Sons Limited. It will be noticed that an edge of the output waveform (designated as the trailing edge in FIGURE 2) is curved or exponentially sloped. The reason for this slope is that in a conventional multivibrator each timing capacitor, during its recovery, must charge through the collector biasing resistor of the non-conducting (for the moment) transistor of the multivibrator. As a result the collector voltage of such transistor changes relatively slowly, instead of rapidly, when such transistor turns off, so that the exponential charging of the capacitor is reflected in the output waveform.

Figure 3:
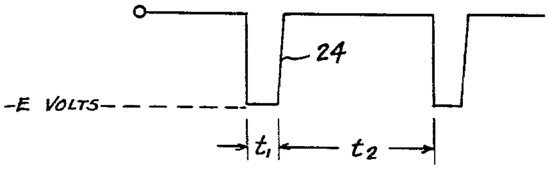
FIGURE 3 shows an output waveform for a free running multivibrator circuit according to the invention.

In the applicant's multivibrator circuit the capacitors establish their quiescent state very quickly as described above (i.e. because of diodes D1 and D5 through which capacitor C1 may discharge and diodes D3 and D6 through which capacitor C2 may discharge) and hence the output wave form (taken at the collector of either transistor) is considerably sharper in form than that of the conventional circuit, as may be seen in FIGURE 3. It will be noted that the rising edge 24 of the output waveform of FIGURE 3 has a slope slightly less steep than the falling edge, because each capacitor takes a finite time to discharge to ground through its associated diodes (diodes D1 and D5 for capacitor C1, and diodes D3 and D6 for capacitor C2). However the time required for this discharge is small.

In addition, because of the rapid capacitor recovery, one capacitor can be considerably larger than the other giving a highly asymmetrical output waveform as shown in FIGURE 3, where $t1$ represents the duration of a conducting period of transistor Q1 and $t2$ represents a duration of a conducting period of transistor Q2. In other words the ratio of time $t2$ to time $t1$ (or vice versa) can be large.

The values of times $t1$ and $t2$ are given approximately by the following expressions, ignoring voltage drops in the diodes:

$$t1=C1\left[(R1+R2)\ln\frac{2R2}{R1+R2}+R1\ln\frac{1}{1+R2\left(\frac{1}{\beta 1R5}-\frac{1}{R7}\right)}\right]$$

and $$t2=C2\left[(R3+R4)\ln\frac{2R4}{R3+R4}+R3\ln\frac{1}{1+R4\left(\frac{1}{\beta 2R6}-\frac{1}{R8}\right)}\right]$$

where $\beta 1$ and $\beta 2$ are the collector to base current ratios of transistors Q1 and Q2 respectively, measured with the transistors being about one volt out of saturation and carrying the current as determined by the collector load. For a symmetrical output wave form capacitor C1 should be equal to capacitor C2.

By causing a short circuit between the base and emitter of either or both of the transistors for a minimum period of one cycle of the multivibrator the oscillation will cease and the multivibrator will remain off without the short circuit or hold off potential being necessary. The multivibrator may be retriggered with a negative pulse supplied to either of the bases.

The short circuit between the base and emitter may be provided by either a mechanical set of contacts or an electronic switch such for example as the collector-emitter circuit of transistor Q3, transistor Q3 being driven into saturation through resistor R10 by a negative potential applied at terminal 22. It may be noted that a conventional multivibrator also may be stopped by this method but it requires that the hold off potential, or the short circuit, be maintained to keep it off. Otherwise oscillation would begin immediately after removal of the short circuit or hold off potential.

I claim:

1. A free running multi-vibrator device comprising (a) first and second transistors, (b) first and second coupling arms interconnecting said transistors for mutual reversal of state, (c) first coupling arm including (1) a first capacitance, (2) means coupling one side of said first capacitance to the base of said first transistor, (3) means coupling the other side of said first capacitance to the collector of said second transistor and providing a substantially zero impedance path for collector current of said second transistor between the collector of said second transistor and said first capacitance, (d) said second coupling arm including (1) a second capacitance, (2) means coupling one side of said second capacitance to the base of said second transistor, (3) means coupling the other side of said second capacitance to the collector of said first transistor and providing a substantially zero impedance path for collector current of said first transistor between the collector of said first transistor and said second capacitance, (e) resistance means connected in series with said first capacitance to form, with said first capacitance, a first timing circuit, and means for connecting said first timing circuit across a source of potential to charge said first capacitance, (f) further resistance means connected in series with said second capacitance to form, with said second capacitance, a second timing circuit, and means for connecting said second timing circuit across said source of potential to charge said second capacitance, (g) first diode means connected between said one side of said first capacitance and the emitter of said first transistor, said first diode means being poled to conduct collector current of said second transistor flowing through said first capacitance, (h) second diode means connected between said one side of said second capacitance and the emitter of said second transistor, said second diode means being poled to conduct collector current of said first transistor flowing through said second capacitance, (i) a low impedance means connecting together the emitters of said transistors;

whereby, when said first transistor conducts, said first capacitance charges through said first timing circuit until said one side of said first capacitance approaches the emitter potential of said first transistor to terminate conduction of said first transistor, said second transistor then commencing conduction and said first capacitance discharging through a very low impedance path consisting of the emitter-collector path of said second transistor, said means (c) (3), said first capacitance, said first diode means, and said low impedance means (i), for rapid recovery of said first capacitance, and as said second transistor conducts, said second capacitance charges through said second timing circuit until said one side of said second capacitance approaches the emitter potential of said second transistor to terminate conduction of said second transistor, said first transistor then commencing conduction and said second capacitance discharging through a very low impedance path consisting of the emitter-collector path of said first transistor, said means (d) (3), said second capacitance, said second diode means, and said low impedance means (i), for rapid recovery of said second capacitance.

2. A free running multi-vibrator device according to claim 1 wherein (j) said means (c) (2) comprises third diode means, like polarity terminals of said first and third diode means being connected together, said third diode means thus being poled in a direction to prevent base current of said first transistor from passing therethrough, (k) said means (d) (2) includes fourth diode means, like polarity terminals of said second and fourth diode means being connected together, said fourth diode means thus being poled in a direction to prevent base current of said second transistor from passing therethrough, (*l*) and said device includes biasing means connected to the base of said first transistor and for connection to said source of potential, and further biasing means connected to the base of said second transistor and for connection to said source of potential, for forward biasing of said first and second transistors respectively when said third and fourth diode means respectively are reverse biased.

3. A free running multi-vibrator device for use with a source of potential which supplies first and second potentials, said device comprising (a) first and second transistors each of a type that is forward biased when its base and collector are closer to said second potential than its emitter, (b) first and second coupling arms interconnecting said transistors for mutual reversal of state, (c) said first coupling arm including first diode means connected to the base of said first transistor, said first diode means being poled in a direction to prevent base current of said first transistor from passing therethrough, said first coupling arm further including a first capacitance having one side connected to said first diode means and having its other side coupled to the collector of said second transistor, (d) said second coupling arm including second diode means connected to the base of said second transistor, said second diode means being poled in a direction to prevent base current of said second transistor from passing therethrough, said second coupling arm further including a second capacitance having one side connected to said second diode means and having its other side coupled to the collector of said first transistor, (e) a first timing resistance connected to said one side of said first capacitance and for connection to said first potential, and a second timing resistance connected to said other side of said first capacitance and for connection to said second potential, (f) a third timing resistance connected to said one side of said second capacitance and for connection to said first potential, and a fourth timing resistance connected to said other side of said second capacitance and for connection to said second potential, (g) biasing means connected to the base of said first transistor and for connection to said second potential, for carrying base current of said first transistor, (h) and further biasing means connected to the base of said second transistor and for connection to said second potential, for carrying base current of said second transistor;

whereby when said first transistor ceases conduction, the potential at the collector of said first transistor shifts toward said second potential, and charging current flows through said third and fourth timing resistances and said second capacitance to reverse bias said second diode means, said second transistor then commencing conduction and being isolated during its conducting period by said second diode means from said second capacitance, said second capacitance then continues to charge through said third and fourth timing resistances to control the duration of conduction of said second transistor, said second transistor ceasing conduction when the voltage at said one side of said second capacitance approaches the emitter voltage of said second transistor and said second diode means becomes forward biased, the potential at the collector of said second transistor then shifting toward said second potential, and charging current flows through said first and second timing resistances and said first capacitance to reverse bias said first diode means, said first transistor then commencing conduction and being isolated during its conducting period by said first diode means from said first capacitance, said first capacitance then continues to charge through said first and second timing resistances to control the duration of conduction of said first transistor.

4. A multi-vibrator device according to claim 3 wherein (i) said first coupling arm includes third diode means connected between said other side of said first capacitance and the collector of said second transistor, said third diode means being poled in the same direction as said first diode means, (j) and said second coupling arm includes fourth diode means connected between said other side of said second capacitance and the collector of said second transistor, said fourth diode means being poled in the same direction as said second diode means.

5. A multi-vibrator device according to claim 4 including (k) fifth diode means connected between the emitter of said first transistor and the junction of said first diode means with said first capacitance, like polarity terminals of said first and fifth diode means being connected together, (l) sixth diode means connected between the emitter of said second transistor and the junction of said second diode means with said second capacitance, like polarity terminals of said second and sixth diode means being connected together, (m) and low impedance means for connecting the emitters of said transistors to a common potential between said first and second potentials.

6. A multi-vibrator device according to claim 3 wherein (i) said biasing means (g) comprises a fifth resistance greater in value than said first resistance, said first resistance being greater in value than said second resistance, (j) and said biasing means (h) comprises a sixth resistance greater in value than said third resistance, said third resistance being greater in value than said fourth resistance.

7. A multi-vibrator device according to claim 6 including (k) third diode means connected between the emitter of said first transistor and the junction of said first diode means with said first capacitance, like polarity terminals of said first and third diode means being connected together, (l) fourth diode means connected between the emitter of said second transistor and the junction of said second diode means with said second capacitance, like polarity terminals of said second and fourth diode means being connected together, (m) and low impedance means for connecting the emitters of said transistors to a common potential between said first and second potentials.

8. A free-running multivibrator device comprising (a) first and second transistors, (b) coupling means interconnecting said transistors for mutual reversal of state, (c) said coupling means comprising a first coupling arm including a first capacitance having one side coupled to the collector of said second transistor, and first diode means connected between the other side of said first capacitance and the base of said first transistor, said first diode means being poled in a direction to prevent base current of said first transistor from passing therethrough, (d) said coupling means also including a second coupling arm including a second capacitance having one side coupled to the collector of said first transistor, and second diode means connected between the other side of said second capacitance and the base of said second transistor, said second diode means being poled in a direction to prevent base current of said second transistor from passing therethrough, (e) a source of potential including a first potential, a second potential, and a reference potential between said first and second potentials, (f) a first resistance connected between said first potential and said one side of said first capacitance and a second resistance connected between the said other side of said first capacitance and said second potential, (g) a third resistance connected between said first potential and said one side of said second capacitance, and a fourth resistance connected between said other side of said second capacitance and said second potential, (h) a fifth resistance connected between said first potential and the base of said first transistor, and a sixth resistance connected between said first potential and the base of said second transistor, (i) third diode means connected to the emitter of said first transistor and extending to the junction of said first diode means with said first capacitance, like polarity terminals of said first and third diode means being connected together, (j) fourth diode means connected to the emitter of said second transistor and extending to said junction of said second capacitance with said second diode means, like polarity terminals of said second and fourth diode means being connected together, (k) the emitters of both said transistors being connected to said reference potential, (l) said fifth resistance being greater than said second resistance, said second resistance being greater than said first resistance, and said sixth resistance being greater than said fourth resistance, said fourth resistance being greater than said third resistance.

9. A free-running multivibrator device according to claim 8 including a fifth diode means connected between said one side of said first capacitance and the collector of said second transistor, a seventh resistance connected between the collector of said second transistor and said first potential, a sixth diode means connected between said one side of said second capacitance and the collector of said first transistor, and an eighth resistance connected between the collector of said first transistor and said first potential.

References Cited by the Examiner

UNITED STATES PATENTS

| | | | |
|---|---|---|---|
| 2,502,687 | 4/1950 | Weiner | 331—144 X |
| 2,737,587 | 3/1956 | Trousdale | 331—113 |
| 2,787,712 | 4/1957 | Priebe et al. | 331—113 |
| 2,900,606 | 8/1959 | Faulkner | 331—113 |
| 2,918,586 | 12/1959 | Curtis | 31—113 X |
| 3,039,065 | 6/1962 | Regis | 331—113 |

FOREIGN PATENTS

| | | |
|---|---|---|
| 132,047 | 4/1946 | Australia. |
| 815,668 | 7/1959 | Great Britain. |

ROY LAKE, *Primary Examiner.*

J. B. MULLINS, *Assistant Examiner.*